United States Patent
Wakuda (10) Patent No.: US 6,535,347 B1
(45) Date of Patent: Mar. 18, 2003

(54) HEAD CONTROLLING DEVICE IN A DISK APPARATUS

(75) Inventor: Hiroshi Wakuda, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/492,415

(22) Filed: Jan. 27, 2000

(30) Foreign Application Priority Data

Feb. 1, 1999 (JP) ............................................. 11-023688

(51) Int. Cl.[7] ............................................... G11B 5/596
(52) U.S. Cl. ................ 360/77.03; 360/77.02; 360/78.11
(58) Field of Search ......................... 360/77.03, 78.04, 360/78.11, 78.12, 78.13

(56) References Cited

U.S. PATENT DOCUMENTS

| 5,179,485 A | * | 1/1993 | Tamayama | 360/106 |
|---|---|---|---|---|
| 5,196,970 A | * | 3/1993 | Seko et al. | 360/77.03 |
| 5,274,511 A | * | 12/1993 | Ikeda | 360/55 |
| 5,305,159 A | * | 4/1994 | Sakai et al. | 360/77.02 |
| RE35,302 E | * | 7/1996 | Hoshimi et al. | 360/77.11 |
| 5,835,304 A | | 11/1998 | Shimazu et al. | 360/99.01 |

* cited by examiner

Primary Examiner—Andrew L. Sniezek
(74) Attorney, Agent, or Firm—Brinks Hofer Gilson & Lione (57) ABSTRACT

A head-controlling device of a disk apparatus is provided that can precisely move a head stepwise to the position of each track on a recording surface of a disk. When detection output values A1 and B1 of phases A and B that are out of phase satisfy a relational value, a determination is made that a magnetic head is aligned with the position of a track. The calculation of the relational value of the phase A and the phase B detection values makes it possible to reliably align the head with each track position even when the phase difference of the two phases is not correct.

6 Claims, 7 Drawing Sheets

HEAD CONTROLLING DEVICE IN A DISK APPARATUS

BACKGROUND OF THE INVENTION

1. Field of the Invention

The present invention relates to the recording and the reproducing of data onto and from a floppy disk (FD), and more particularly to a head controlling device provided in a disk apparatus to precisely move a head stepwise to the position of each track on a recording surface of a disk.

2. Description of the Related Art

In conventional floppy disk drive apparatuses, a stepwise driving mechanism using, for example, a stepping motor is used as a head-advancing device for moving a head stepwise to the position of each track on a recording surface of a disk. Data is concentrically recorded on the tracks of the disk. The head is positioned at the position of each track as a result of a mechanical stepwise operation of the head-advancing device.

In some disk apparatuses, a head-advancing device of the linear driving type which can move the head continuously is provided. In such disk apparatuses, a detecting section detects the position of the head that is moved by the head-advancing device. Based on the outputs from the detecting section, determinations are made as to whether or not the head has arrived at the positions of each of the tracks on a recording surface of a disk.

In some disk apparatuses including a head-advancing device of the linear driving type, a high-density-recording disk (on which servo signals used for tracking operations are recorded) and a floppy disk (FD) can both be loaded. When the high-density-recording disk is loaded into the disk apparatus, the head is moved by linear driving. When the head reads the servo signals, determinations are made that the head has been positioned at each of the tracks. On the other hand, when the floppy disk is loaded into the disk apparatus, the head-advancing position is controlled on the basis of detection outputs from the detecting section to position the head at the position of each track.

Figure 3:
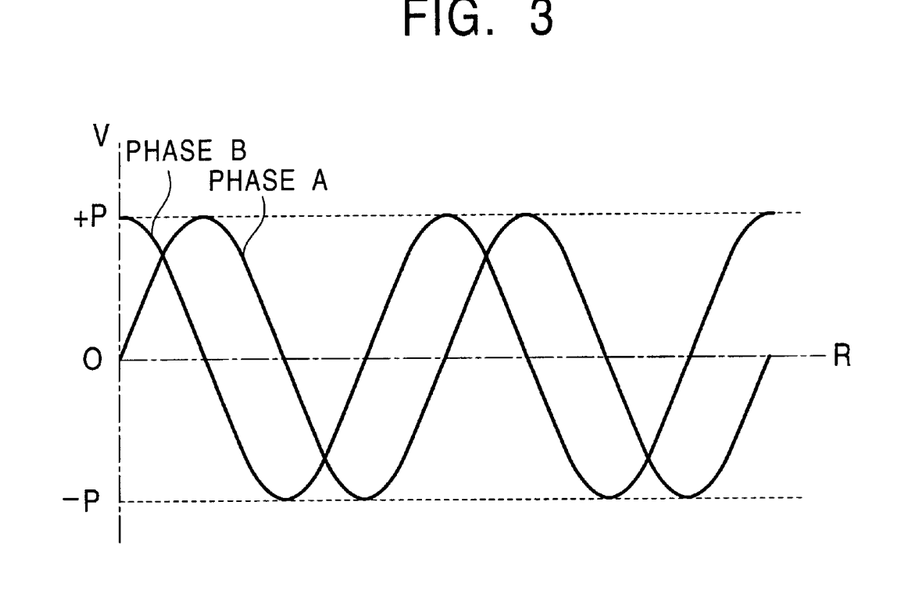
FIG. 3 is a graph illustrating the waveforms of phase A and phase B detection outputs.

FIG. 3 illustrates an example of detection outputs from the detecting section when the head has been advanced. In FIG. 3, position R to which the head is moved in a radial direction of the disk is indicated along the horizontal axis, whereas detection output voltage V (or time) is indicated along the vertical axis. A phase A detection output and a phase B detection output are out of phase by $\pi/2$ (rad). When, for convenience, values halfway between the amplitude peaks (P-P) of the detection outputs are defined as the zero points, the phase A detection output is a sine curve and the phase B detection output is a cosine curve, or these detection outputs are curves that approximate to those based on these trigonometric functions.

Conventionally, a standard (or alignment) disk is loaded onto a rotational drive section of a disk apparatus and is rotated. While the head is moving in a radial direction of the disk, reproduction outputs from the head are inspected. When the reproduction outputs reach the peak values, and the head is positioned at the position of a track on the standard disk, the mounting position of the detecting section is adjusted so that either the phase A detection output or the phase B detection output becomes 0.

When a floppy disk is loaded into a disk apparatus adjusted in the above-described manner in order to carry out a recording or a reproducing operation, a controlling section monitors the detection outputs from the detecting section. When the phase A detection output and the phase B detection outputs become 0, the advancement of the head is stopped, so that the head is moved stepwise and positioned at the position of each of the tracks.

However, in the above-described conventional method of controlling the advancement of the head, many manhours are needed to adjust the mounting position of the detecting section because it needs to be carried out while observing the detection outputs illustrated in FIG. 3. In addition, skill and experience are required to adjust the mounting position of the detecting section. Further, it is difficult to adjust the phase A and the phase B detection outputs exactly at zero when the head has reached the position of a track, so that adjustment errors inevitably occur.

SUMMARY OF THE INVENTION

Accordingly, in order to overcome the above-described problems, it is an object of the present invention to provide a head-controlling device of a disk apparatus in order to allowing precise positioning of a head in correspondence with the position of each track, without having to adjust the position of a detecting section that provides phase A and phase B detection outputs, and without having to carry out precise adjustments.

To this end, according to one aspect of the present invention, there is provided a head-controlling device of a disk apparatus, the disk apparatus comprising a rotational drive section for rotating a disk; a head opposing a recording surface of the disk; head-advancing means for advancing the head in a radial direction of the disk; a detecting section whose detection outputs change in accordance with a movement of the head; and a controlling section for controlling the head-advancing means based on the detection outputs obtained from the detecting section in order to move the head stepwise to the position of a track on the recording surface of the disk;

wherein the detecting section outputs either trigonometric function values of phases A and B that are out of phase or values of curves that approximate to those based on the trigonometric functions of the phases A and B that are out of phase; and wherein the controlling section retains the phase A and the phase B values produced when the head reaches the track, and, during a recording or a reproducing operation on the disk, controls the head-advancing means so as to stop the head when the phase A value or the phase B value detected from the detecting section matches the phase A value or the phase B value retained in the controlling section.

Although not exclusive, in one form of one aspect of the present invention, the phase A and the phase B values retained by the controlling section may be values other than trigonometric function values or values of halfway between amplitude peaks of the trigonometric-function-value-based curves.

According to the present invention, the detecting section is an optical means, a magnetic means, or the like. It is preferable that the phase A and the phase B detection outputs are out of phase by $\pi/2$ (rad). Here, the two phase detection outputs are based on sine and cosine functions, respectively, or functions-approximate to these functions.

According to the present invention, in the case where a recording or a reproducing operation is performed on the disk that is loaded, a determination is made that the head has reached the position of the track not based on the position when the phase A and the phase B detection outputs become 0, but based on when the phase A detection output or the phase B detection output becomes a predetermined value. Therefore, it is possible to determine that the head has reached the position of the track when a recording or a reproducing operation is performed on a disk, without having to adjust the mounting position of the detecting section during the manufacturing process. Therefore, it is possible to control the stepwise movement of the head with high precision.

Although not exclusive, in another form of one aspect of the present invention, the controlling section may retain the phase A and the phase B values produced when the head reaches the position of the track, with the values being obtained using highly linear areas of the areas of the phase A and the phase B detection outputs, obtained from the detecting section, located within an amplitude range that is smaller than a peak-to-peak amplitude range, the highly linear areas of the phases A and B being mutually continuous in terms of time.

Accordingly, when areas of the phase A and the phase B detection outputs having a high degree of linearity are only used, the stepwise movement of the head can be controlled with high precision.

According to a second aspect of the present invention, there is provided a head-controlling device of a disk apparatus, the disk apparatus comprising a rotational drive section for rotating a disk; a head opposing a recording surface of the disk: head-advancing means for advancing the head in a radial direction of the disk; a detecting section whose detection outputs change in accordance with a movement of the head; and a controlling section for controlling the head-advancing means based on the detection outputs obtained from the detecting section in order to move the head stepwise to the position of a track on the recording surface of the disk;

wherein in accordance with a movement of the head the detecting section outputs either trigonometric function values or values of curves approximate to those based on the trigonometric function values of phases A and B that are out of phase; and wherein the controlling section retains a value showing a relationship between the values of the phases A and B produced when the head reaches the position of the track, and, during a recording or a reproducing operation on the disk, calculates the phase A value and the phase B value detected from the detecting section in order to control the head-advancing means so as to stop the head when the calculated result matches the relational value.

Accordingly, when the relational value showing a relationship between the phase A and the phase B value is determined, and the head-advancing position is controlled based on this relational value, it is possible to smoothly control the alignment of the head with the track position even when the phase A and the phase B detection outputs are out of phase by a specified value such as π/2 (rad) due to manufacturing errors in the detecting section.

Although not exclusive, in one form of the second aspect of the present invention, the relational value may be the sum of or the difference between the phase A and the phase B values produced when the head reaches the position of the track.

Although not exclusive, in another form of the second aspect of the present invention, when the phase A and the phase B detection outputs plotted on an X-Y coordinate system, with X and Y axes intersecting at right angles, and when the phase A and the phase B values are An and Bn when the head is aligned with the track, an inclination angle θ made by a line connecting the center of the coordinate system and a point of intersection of lines drawn from X=An and Y=Bn, on the coordinate system, may be equal to the relational value.

Although not exclusive, θ may be easily calculated from Formula 1 in which x is an arbitrary value.

When this calculation is performed, θ is the only variable used in controlling the head position, thereby facilitating the detection of the head position.

Although not exclusive, in a form of the first aspect or the second aspect of the present invention, when a standard disk is placed on the rotational drive section, and the head reaches the position of a track on the standard disk, the phase A and the phase B values obtained from the detecting section or the relational value may be retained in a retaining section.

BRIEF DESCRIPTION OF THE DRAWINGS

FIGS. 2A and 2B illustrate an example of the structure of a detecting section. More specifically.

DESCRIPTION OF THE PREFERRED EMBODIMENT

Figure 1:
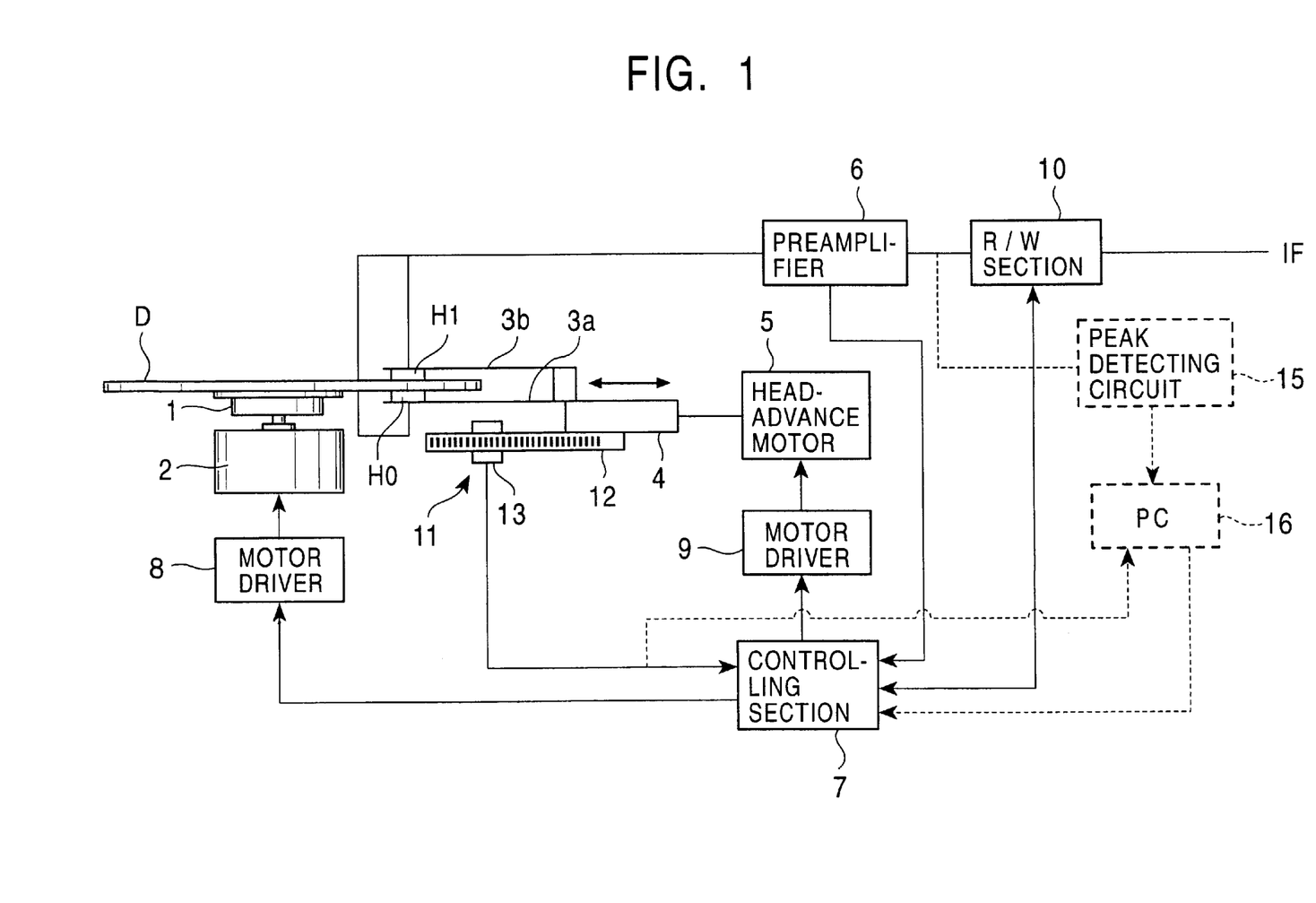
FIG. 1 is a block diagram illustrating a head-controlling device of the present invention.

FIG. 1 is a block diagram of a disk apparatus in accordance with the present invention.

The disk apparatus comprises a turntable, that is, a rotational drive section 1, which is rotationally driven by a spindle motor 2. When a disk D is loaded onto the rotational drive section 1, a magnetic head H0 comes into contact with one of the recording surfaces of the disk D, while a magnetic head H1 comes into contact with the other recording surface.

The magnetic head H0 is supported by a supporting arm 3a, while the magnetic head H1 is supported by a supporting arm 3b. Both of the supporting arms 3a and 3b are supported by a head-moving base 4, which can be advanced continuously at a certain speed in a radial direction of the disk D by a head-advancing motor 5 such as a linear motor.

The magnetic heads H0 and H1 are connected to an input/output interface (IF) through a preamplifier 6 and a recording/reproducing (R/W) section 10. Reproduction outputs from the preamplifier 6 are input to a controlling section 7, which controls the R/W section 10. The control section 7 also controls a motor driver 8 in order to subject the spindle motor 2 to a servo-driving operation; and a motor driver 9 in order to subject the head-advancing motor 5 to a servo-driving operation.

Two types of disk D can be loaded into the disk apparatus: high-density-recording disks and floppy disks (FD) formed based on standards similar to those of conventional floppy disks. Servo-signals used for tracking recording surfaces are recorded on the high-density-recording disks. The controlling section 7 detects the servo-signals due to the reproduction outputs from the preamplifier 6. At the time of the detection, when the advancement of the magnetic head is stopped by the head-advancing motor 5, high-density recording/reproducing magnetic gaps of the magnetic heads H0 and H1 are positioned at each of the tracks on the disk D.

Servo-signals are not recorded on floppy disks (FD). Therefore, when they are loaded into the disk apparatus, the detecting section 11 detects the positions of low-density-recording/reproducing magnetic gaps of the heads H0 and H1 in order to input detection outputs to the controlling section 7. Based on the detection outputs, the controlling section 7 controls the head-advancing motor 5. When the magnetic gaps reach the positions of corresponding record tracks on the disk D, the motor 5 stops and the positions of the magnetic heads H0 and H1 are determined.

The detecting section 11 comprises a linear scale 12 that moves in a radial direction of the disk D along with the head base 4, and an optical detecting means 13 for detecting the movement of the linear scale 12.

Figure 2A:
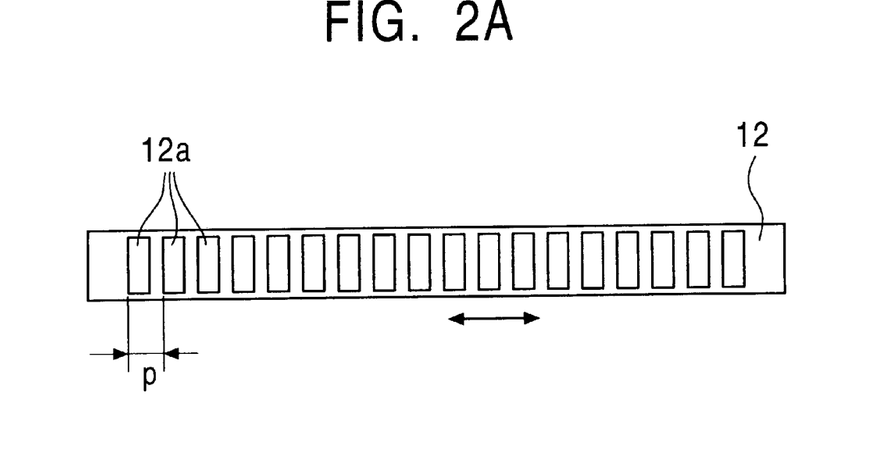
FIG. 2A is a side view of a linear scale.
Figure 2B:
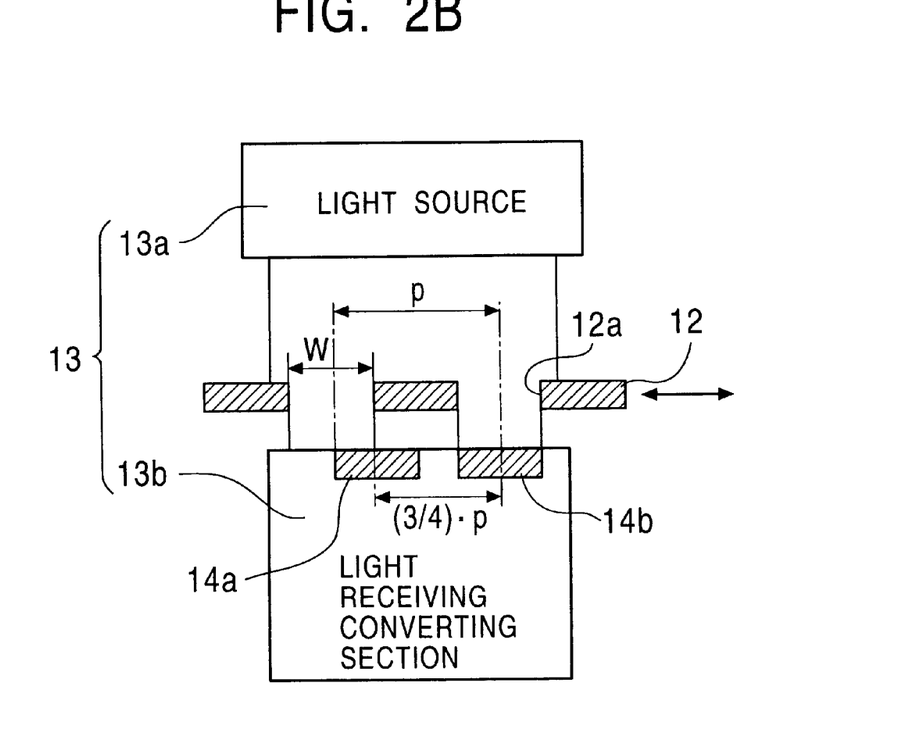
FIG. 2B is a partial plan view illustrating the relationship between an optical detecting section and the linear scale.

As shown in FIG. 2A, the linear scale 12 is a long plate with a plurality of detection windows 12*a* formed as openings at a certain pitch. As shown in FIG. 2B, the optical detecting means 13 comprises a light source 13*a* and a light-receiving-converting section 13*b*. They are placed on opposite sides of and affixed to the linear scale 12 so as to sandwich the linear scale 12. The light-receiving-converting section 13*b* comprises light-receiving elements 14*a* and 14*b*.

When the detection windows 12*a* are formed as openings with a pitch p in the linear scale 12, the distance (or the pitch) between the light-receiving elements 14*a* and 14*b* is (3/4)×p. The widths of the light-receiving elements 14*a* and 14*b* are greater than widths W of the detection windows 12*a* in a direction of movement thereof. The pitch p is equal to an integral fraction of the pitch between the record tracks on the recording surfaces of the disk D.

Light emitted from the light source 13*a* passes through the detection windows 12, formed in the linear scale 12, and is detected by the light-receiving elements 14*a* and 14*b*. When relative movement occurs between the linear scale 12 and the optical detecting means 13, the outputs resulting from the detections of changes in strength that occur in accordance with trigonometric functions or something similar to trigonometric functions are selected from the light-receiving elements 14*a* and 14*b* based on the quantity of light received. From the relationship between the pitch p of adjacent detection windows 12*a* in the linear scale 12 and the detection outputs, the light reception outputs obtained from the light-receiving elements 14*a* and 14*b* are out of phase by $\pi/2$ (rad).

Figure 4:
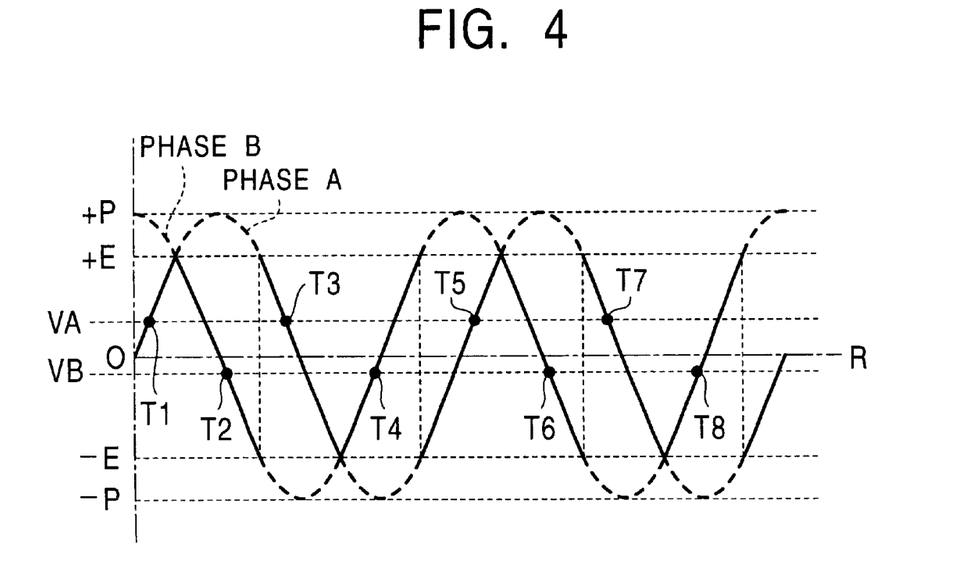
FIG. 4 illustrates highly linear areas of the areas of the waveforms of FIG. 3.

FIGS. 3 and 4 illustrate the detection outputs obtained from the light-receiving-converting section 13*b* when the magnetic heads H0 and H1 have moved along with the linear scale 12. The horizontal axis represents position R (time) to which the head moves in a radial direction of the disk D, while the vertical axis represents detection output strength V (or the voltage obtained after photoelectric conversion). The detection output obtained by the light reception by the light-receiving element 14*a* is defined as phase A, while the detection output obtained by the light reception by the light-receiving element 14*b* is defined as phase B.

As shown in FIGS. 3 and 4, the phase A and phase B detection outputs are sine waves and cosine waves, respectively. For convenience, from FIG. 3 onwards, values halfway between the peaks (P-P) of the strengths of the phase A and the phase B detection outputs are defined as the zero points. The peak values are represented by +P and −P.

In the present invention, when the phase A detection output has a voltage equal to a predetermined voltage Va, the low-density-recording/reproducing magnetic gaps of the magnetic heads H0 and H1 are positioned at, for example, odd-numbered tracks, such as T1, T3, T5, etc. of the disk D. On the other hand, when the phase B detection output has a voltage equal to a predetermined voltage Vb, the magnetic gaps of the magnetic heads H0 and H1 are positioned at even-numbered tracks T, such as T2, T4, T6, etc.

The voltage Va of the phase A detection output and the voltage Vb of the phase B detection output are stored and retained in the controlling section 7. When a floppy disk loaded onto the rotational drive section 1 is rotationally driven, the magnetic heads H0 and H1 are moved in a radial direction of the disk D by the head-advancing motor 5. At this time, the magnetic gaps of the magnetic heads H0 and H1 are stopped at each of the tracks on the disk D by stopping the head-advancing motor 5 each time the voltages of the phase A and the phase B detection outputs obtained from the light-receiving-and-converting section 13*b* of the optical detecting means 13 become equal to the predetermined values Va and Vb, respectively.

A description will now be given of the method of carrying out a setting operation to determine the predetermined values Va and Vb. In the setting method, a peak-detecting circuit 15 and a computer (or a personal computer (PC)) shown in FIG. 1 are used. The peak-detecting circuit 15 is used to detect the peak values of an output from the preamplifier. The computer 16 is used to, for example, give out a data record command to the controlling section 7 based on the peak values detected by the peak-detecting circuit 15.

In the setting method, a standard alignment disk whose tracks are provided so as to match standard values is set on the rotational drive section 1. While the standard disk is being rotated, the head base 4 is moved by the head-advancing motor 5 in order to scan the recording surface or surfaces of the standard disk in a radial direction thereof by the magnetic head H0 and/or the magnetic head H1.

The peak values of the reproduction output obtained from the magnetic head H0 and/or the peak values of the reproduction output obtained from the magnetic head H1 through the preamplifier 6 is/are detected by the peak-detecting circuit 15. When the low-density-recording/reproducing gap of the magnetic head H0 and/or the low-density-recording/reproducing gap of the magnetic head H1 is/are aligned with the position of a track of the standard disk, the peak-detecting circuit 15 detects the reproduction output peak values.

When the head base 4 is moved in a radial direction of the standard disk, the phase A and the phase B detection outputs shown in FIG. 3 are obtained from the detecting section, and are monitored. When the peak values thereof are detected by the peak-detecting circuit 15, the phase A value (or the phase A detection voltage) Va and the phase B value (or the phase B detection voltage) Vb are retained in the controlling section 7. Based on a command from the computer 16, the values Va and Vb are stored in, for example, a nonvolatile storage element (or an electrically programmable read-only memory (EPROM)) in the controlling section 7.

After completing the setting operation, when a recording or a reproducing operation is performed on the floppy disk by the disk apparatus, the phase A and phase B detection outputs from the detecting section 11 are monitored by the controlling section 7. When their voltages become equal to Va and Vb, respectively, the advancement of the magnetic heads is stopped to align the magnetic gaps of the magnetic heads with each of the tracks on the recording surfaces of the floppy disk, as described above.

In the controlling operation, after loading the standard disk, the detection values Va and Vb used for the controlling operation are determined based on the detection of the reproduction output peak values and the detection outputs from the detecting section 11, as mentioned above. Therefore, it becomes unnecessary to carry out the task of positioning the linear scale 12 and the optical detecting means 13 of the detecting section 11 with high precision. In other words, when detection values Va and Vb characteristic of disk apparatuses are obtained, tracking by the magnetic heads becomes possible. Therefore, unlike the case where conventional disk apparatuses are used, it is not necessary to carry out the task (requiring skill and experience) of adjusting the detecting section 11.

Here, in determining the phase A and the phase B detection output values Va and Vb produced when the magnetic gaps of the magnetic heads are aligned with tracks on the disk D, it is preferable to use highly linear areas of the areas in which changes in the phase A and the phase B detection outputs occur based on trigonometric functions or something approximating to trigonometric functions (see FIG. 4).

More specifically, when the values Va and Vb are set at curved portions (indicated by dotted lines in FIG. 4) of the phase A and the phase B detection outputs in FIG. 4, errors in the positions to which the heads are moved when the detection output values Va and Vb are output from the detecting section 11 tend to occur. Therefore, the amplitude areas (indicated by solid lines in FIG. 4) between +E and −E values are only used to set the values Va and Vb. These areas are smaller than the amplitude areas between the peak-to-peak values (P-P) of the phase A and the phase B detection outputs. In the amplitude areas between +E and −E, changes in the detection outputs occur with a high degree of linearity.

In FIG. 4, the solid lines define the highly linear amplitude areas between +E and −E. The detection areas of high linearity of the phase A detection output represented by the solid lines, and the detection areas of high linearity of the phase B detection output similarly represented by the solid lines are mutually continuous in terms of time in directions of movement of the heads in radial directions of the disk D.

Figure 5:
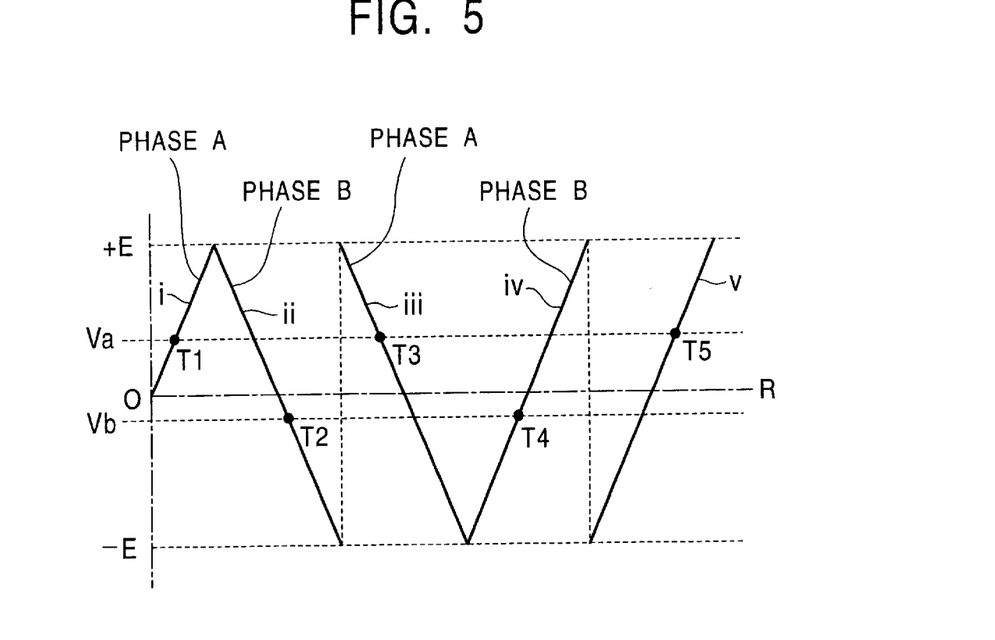
FIG. 5 is a partial enlarged view of FIG. 4.

FIG. 5 is an enlarged view of the highly linear areas of the areas of the detection outputs of FIG. 4. In the case where, after the loading of the standard disk, the phase A and the phase B detection outputs from the detecting section 11 are monitored while the magnetic heads are moved, and in the case where the phase A and the phase B detection outputs are monitored as a result of moving the magnetic heads when they perform a recording or a reproducing operation on a floppy disk that has been loaded, the controlling section 7 extracts a highly linear area i of the phase A detection output. When the output of the area i becomes +E, the controlling section 7 extracts a highly linear area ii of the phase B detection output. When the phase B detection output becomes −E, the controlling section 7 extracts a highly linear area iii of the phase A detection output.

The extraction can be carried out by the controlling section 7 by sampling only the areas of the phase A and the phase B detection outputs, obtained from the detecting section 11, between the output values +E and −E. When the output values become equal to Va and Vb, respectively, in the areas between the output values +E and −E within the sampling range, the magnetic gaps of the magnetic heads H0 and H1 are aligned with the positions of each of the record tracks on the disk D.

Using areas of the phase A and the phase B detection outputs in which there is a high degree of linearity and in which the phase A and the phase B detection outputs are continuous makes it possible to position the magnetic gaps of the magnetic heads at each of the tracks on the disk D with high precision.

In the controlling method illustrated in FIGS. 4 and 5, when the phase A output value becomes Va and the phase B output value becomes Vb during the alternate monitoring of the phase A and the phase B detection outputs by the controlling section 7, the advancing of the heads only need to be stopped, so that this controlling operation carried out to control the head positions can be easily executed using a simple program. However, this controlling method has the following problem. For example, the arrangement pitch between the light-receiving elements 14a and 14b of the optical detecting means 13 is changed, so that when this arrangement pitch is not exactly three-fourths of the pitch p of the detection windows 12a of the linear scale 12, the phase A and the phase B detection outputs are no longer continuous.

Figure 6:
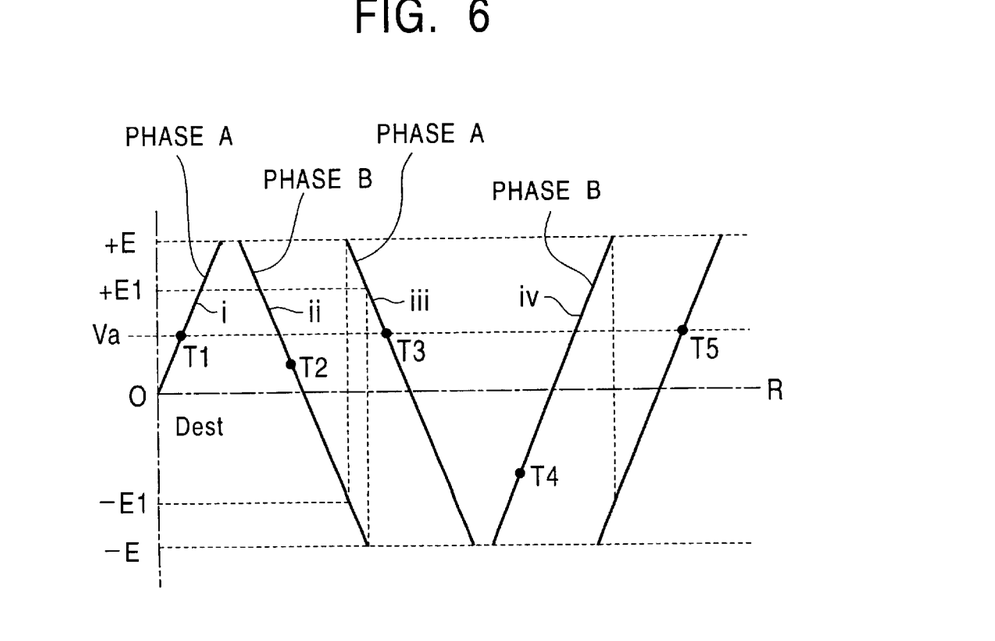
FIG. 6 is an enlarged view corresponding to FIG. 4 when the phase difference between the phase A and phase B waveforms is not right.

FIG. 6 illustrates the phase A and the phase B detection outputs produced when the phase difference between them is not exactly but slightly larger than $\pi/2$ (rad). In this case, the highly linear areas of the phase A detection output and the highly linear areas of the phase B detection output become discontinuous in terms of time.

In this case, the magnetic heads can be positioned at odd-numbered tracks, T1, T3, T5, etc., by setting the predetermined voltage value Va of the phase A detection output as a reference, as shown in FIG. 6. When the predetermined output value of the phase B detection output is set as a reference, the detection output values are not the same when, for example, the heads are positioned at corresponding even-numbered tracks T2 as when the heads are positioned at corresponding even-numbered tracks T4.

Referring to FIG. 6, when, for example, the value of the area ii of the phase B detection output from the detecting section 11 becomes −E, and the area of detection output to be monitored is switched to the area iii of the phase A detection output, the phase A detection output is not +E, but +E1 that is less than +E. Thus, the controlling section 7 determines that a change in the head movement positions caused by a sudden jumping-like movement has occurred, and tries to move them back. When the detection output to be monitored is switched to the phase B detection output after the area iii of the phase A detection output becomes +E, the phase B detection output value becomes −E1, thereby making it more difficult to detect the positions of the heads. This results in controlling operation failure, causing, for example, repeated vibrations during the advancement of the heads.

Figure 7:
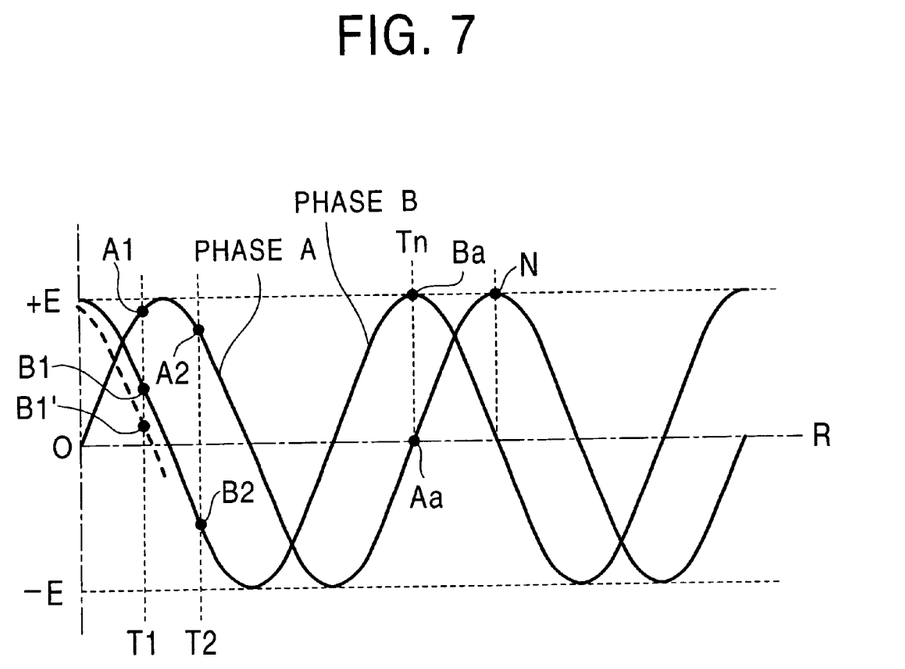
FIG. 7 is an illustration used to obtain a relational value showing the relationship between the phase A and phase B detection outputs.

From FIG. 7 onwards are illustrated a preferred controlling method which allows highly precise positioning of the magnetic gaps of the magnetic heads in correspondence with the positions of each of the tracks even when, for example, the arrangement pitch between the light-receiving elements 14a and 14b of the optical detecting means 13 is not right.

In the controlling method illustrated using FIGS. 4 and 5, the advancement of the heads is stopped only when either the detection value Va of the phase A detection output or the detection value Vb of the phase B detection output is obtained. In the controlling method described below, a relational value showing the relationship between the phase A and the phase B detection outputs is determined, and retained in a storage section of the controlling section 7. Then, in a recording or a reproducing operation performed on a floppy disk, the phase A and the phase B detection outputs from the detecting section 11 are calculated to obtain the aforementioned relational value. When the calculated relational value and the relational value retained in the storage section match, the advancement of the magnetic heads is stopped.

For example, for the relational value, the sum of the phase A and the phase B detection output values that are produced when the magnetic gaps of the magnetic heads are aligned with tracks on the disk D is obtained. With the sum of the phase A and the phase B detection output values in correspondence with the position of each track being used as a reference, when the magnetic heads are stopped, the heads can be reliably positioned at the position of each track even when the phase difference between the phase A detection output and the phase B detection output is not right.

For example, referring to FIG. 7, suppose that the controlling section retains the value Aa+Bb as a relational value for positioning the heads at each of the tracks when the phase A and phase B detection output values are Aa and Ba, respectively, and when the magnetic gaps of the magnetic heads are aligned with tracks Tn. In this case, a detected calculated value equal to the relational value Aa+Bb is obtained at head positions N where the magnetic gaps are not aligned with tracks on the disk D, so that the controlling section 7 may determine that the head gaps are aligned with the track positions by mistake. In such a case, the difference between the phase A and the phase B detection output values is determined.

In FIG. 7, in the case where the difference A−B is negative when the relational value A+B has been obtained as a result of calculating the detection output values, the controlling section 7 determines that the magnetic gaps are aligned with the tracks Tn. On the other hand, when the difference A−B is positive, the controlling section 7 determines that the magnetic gaps are not aligned with tracks Tn but positions N other than the positions of the tracks Tn.

Figure 8:
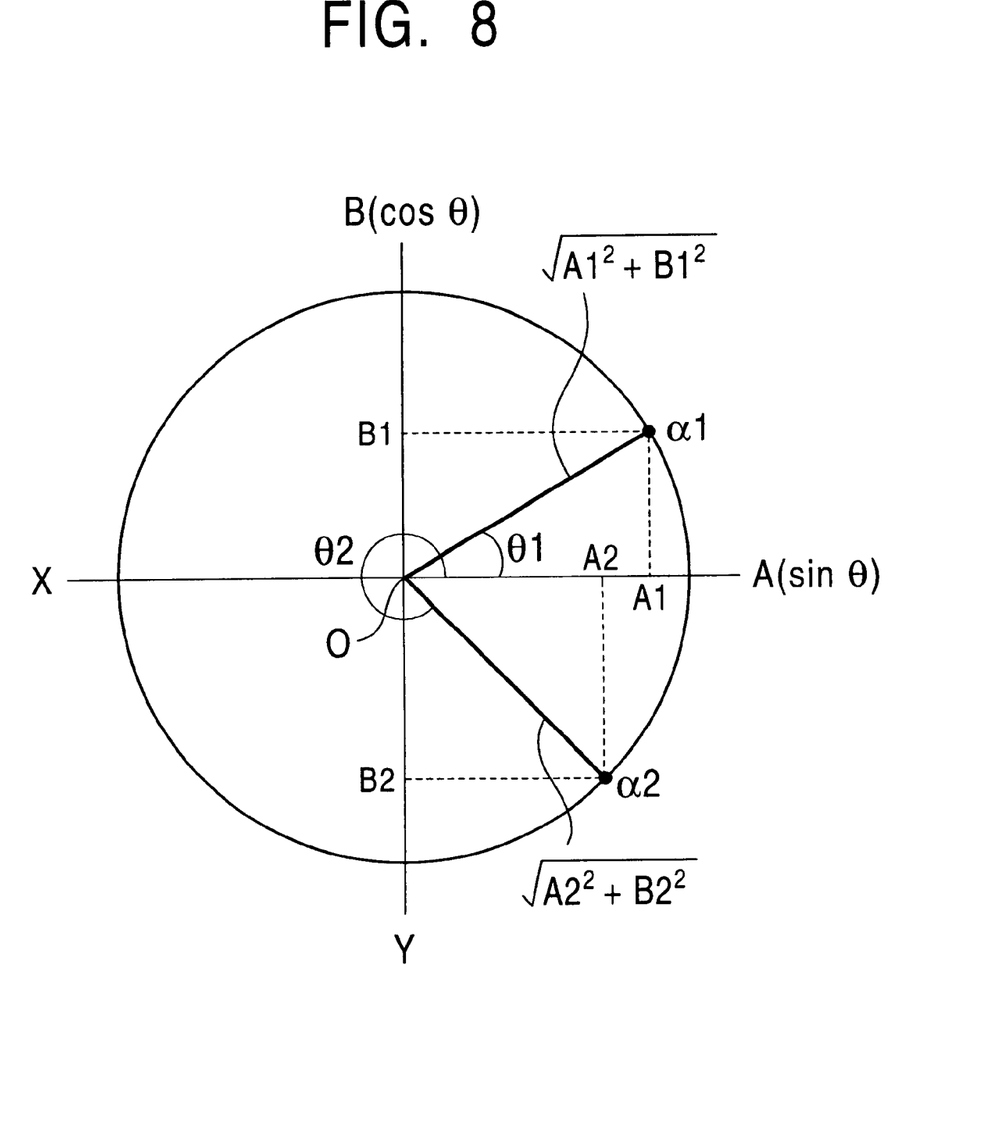
FIG. 8 is an illustration in which loci of a circular arc is used to obtain the relational value showing the relationship between the phase A and phase B detection outputs.

FIG. 8 illustrates a more preferable way of determining the relational value showing the relationship between the phase A detection output value and the phase B detection output value.

The phase A detection output value is Ax, while the phase B detection output value is Bx. Ax and Bx are any arbitrary detection output values between +E and −E.

The controlling section 7 performs a calculation using Formula 2:

$$\theta x = \sin^{-1}\left(\frac{Bx}{\sqrt{Ax^2 + Bx^2}}\right) \quad (2)$$

θn (where n is an integer) when the magnetic gaps are aligned with tracks are retained as a relational value in the storage section of the controlling section 7. When a recording or a reproducing operation is performed on a floppy disk, the controlling section 7 solves the Formula 2. When the advancement of the heads is stopped the calculated θx is equal to the relational value θn and, the magnetic gaps are aligned with each of the tracks on the disk D.

In FIG. 7, the phase A and the phase B detection output values when the magnetic gaps of the magnetic heads are aligned with corresponding tracks T1 on the disk are A1 and B1, respectively. On the other hand, in the same figure, the phase A and the phase B detection output values when the magnetic gaps of the magnetic heads are aligned with corresponding tracks T2 are A2 and B2, respectively. FIG. 8 illustrates the results of the calculation using the Formula 2 based on the detection outputs.

In FIG. 8, an X-Y coordinate system is used, with the X-axis and the Y-axis intersecting each other at right angles. The X-axis represents the phase A detection output, while the Y-axis represents the phase B detection output. The phase A detection output value is A1, while the phase B detection output value is B1. Here, when a point of intersection of a straight line drawn from X=A1 and a straight line drawn from Y=B1 is defined as α1, the angle formed by a line connecting α1 and the origin 0 of the coordinate system, and the X-axis is θ1 from the Formula 2. Similarly, when the phase A detection output value is A2 and the phase B detection output value is B2, the angle formed by a line connecting α2 and the origin, and the X-axis is θ2 from the Formula 2.

When the phase A and the phase B detection outputs have a phase difference of π/2 (rad), the points of intersection α1 and α2 are positioned on loci of a circle whose center coincides with the origin of the X-Y coordinate system. Since the pitch p between the detection windows 12a of the linear scale 12 is actually an integral fraction of the track pitch, there are several angles θn (obtained from solving the Formula 2) when the magnetic gaps get aligned with tracks. By retaining these values in the controlling section 7, the magnetic gaps of the magnetic heads can be precisely aligned with any of the tracks.

In FIG. 7, the dotted line represents the phase B detection output when, as a result of an error in the arrangement pitch between the light-receiving elements 14a and 14b caused during assembly, the phase difference between the phase A and the phase B detection outputs is smaller than π/2 (rad).

Figure 9:
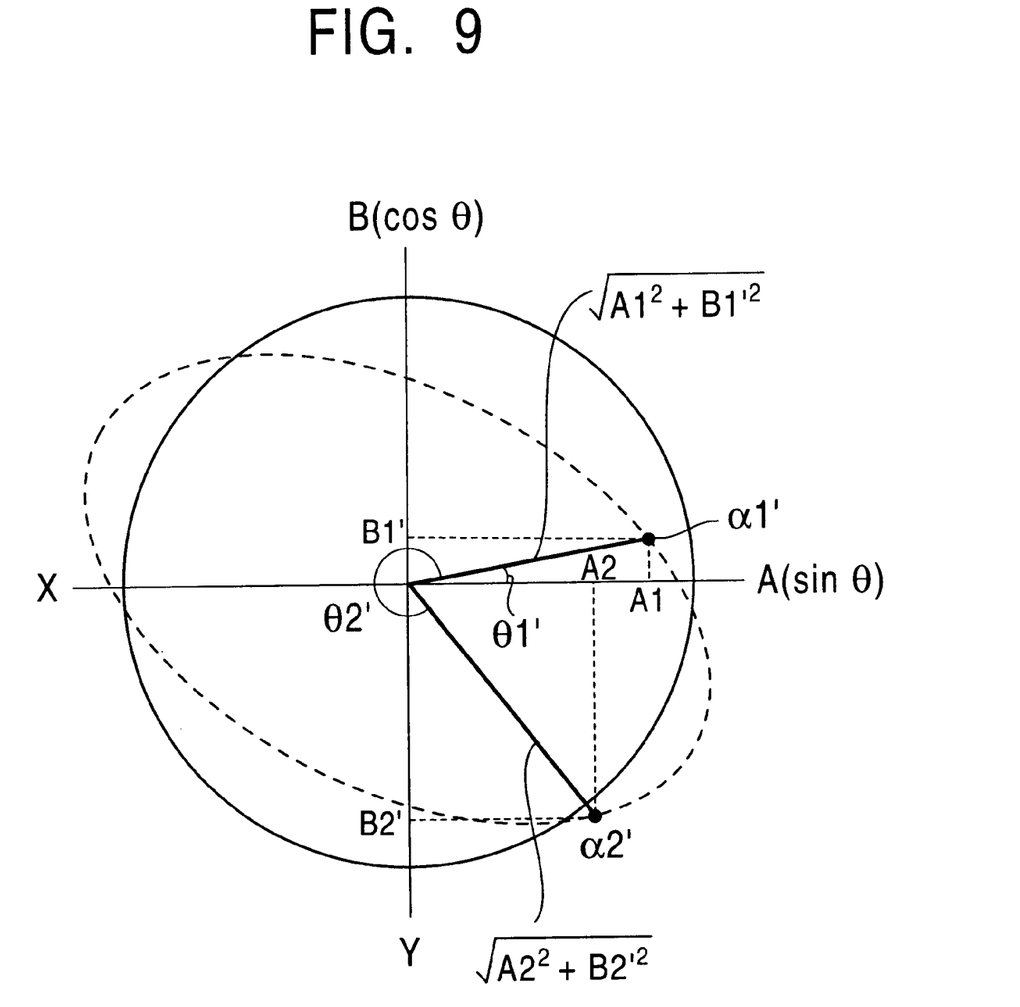
FIG. 9 is an illustration in which loci of an ellipse is used to obtain the relational value showing the relationship between the phase A and phase B detection outputs.

In this case, when the magnetic gaps are aligned with the corresponding tracks T1, the phase A and the phase B detection output values become A1 and B1', respectively. On the other hand, when the magnetic gaps are aligned with the corresponding tracks T2, the phase A and the phase B detection output values become A2 and B2', respectively. Here, points of intersection α1' and aα2' are located on, for example, loci of an ellipse, as shown in FIG. 9.

More specifically, θ1' and θ2' obtained from the Formula 2 possess regularity. When the controlling section 7 retains several calculated values, it is possible to align the magnetic heads with each of the tracks.

As can be understood from the foregoing description, according to the present invention, it is possible to align the magnetic heads with each of the tracks on the disk with high precision, without having to adjust the mounting position of the detecting section which detects the positions to which the magnetic heads, each comprising a linear scale and an optical detecting means, are moved, and without having to perform precise adjustments.

In addition, according to the present invention, it is possible to provide a structure that can position the magnetic heads with high precision even when, for example, there is an error in the assembly of the detecting section.

What is claimed is:

1. A head-controlling device of a disk apparatus, the disk apparatus comprising a rotational drive section for rotating a disk; a head opposing a recording surface of the disk; head-advancing means for advancing the head in a radial direction of the disk; a detecting section whose detection outputs change in accordance with a movement of the head; and a controlling section for controlling the head-advancing means based on the detection outputs obtained from the detecting section in order to move the head stepwise to the position of a track on the recording surface of the disk;

wherein in accordance with a movement of the head the detecting section outputs either trigonometric function values or values of curves approximate to those based on the trigonometric function values of phases A and B that are out of phase; and wherein the controlling section retains a value showing a relationship between the values of the phases A and B produced when the head reaches the position of the track, and, during a recording or a reproducing operation on the disk, calculates the phase A value and the phase B value detected from the detecting section in order to control the head-advancing means so as to stop the head when the calculated result of both phase A and phase B matches the relational value.

2. A head-controlling device according to claim 1, wherein the relational value is the sum of or the difference between the phase A and the phase B values produced when the head reaches the position of the track.

3. A head-controlling device according to claim 1, wherein when the phase A and the phase B detection outputs are plotted on an X-Y coordinate system, with X and Y axes intersecting at right angles, and when the phase A and the phase B values are An and Bn when the head is aligned with the track, an inclination angle θ made by a line connecting the center of the coordinate system and a point of intersection of lines drawn from X=An and Y=Bn, on the coordinate system, is equal to the relational value.

4. A head-controlling device according to claim 2, wherein the inclination angle θ is calculated using the following Formula 1:

$$\theta x = \sin^{-1}\left(\frac{Bx}{\sqrt{Ax^2 + Bx^2}}\right) \quad (1)$$

where x is an arbitrary value.

5. A head-controlling device according to claim 1, wherein when a standard disk is placed on the rotational drive section, and the head reaches the position of a track on the standard disk, the phase A and the phase B values obtained from the detecting section or the relational value are retained in a retaining section.

6. A head-controlling device according to claim 1, wherein when a standard disk is placed on the rotational drive section, and the head reaches the position of a track on the standard disk, the phase A and the phase B values obtained from the detecting section or the relational value are retained in a retaining section.

* * * * *